Nov. 1, 1932.  O. J. SUNDSTRAND  1,885,489
DECIMAL AND NONDECIMAL ADDING AND SUBTRACTING MACHINE
Filed June 13, 1928  6 Sheets-Sheet 1
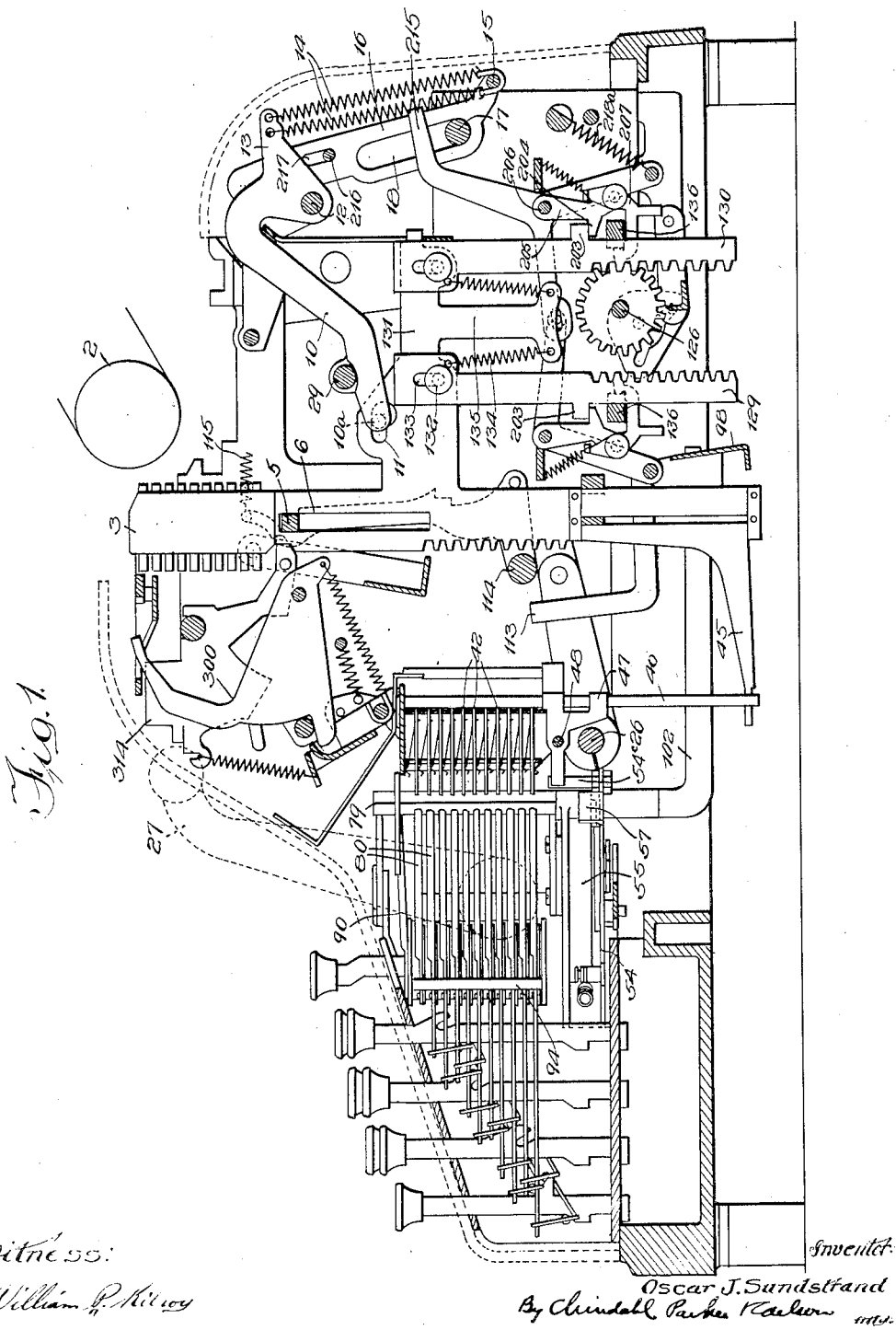

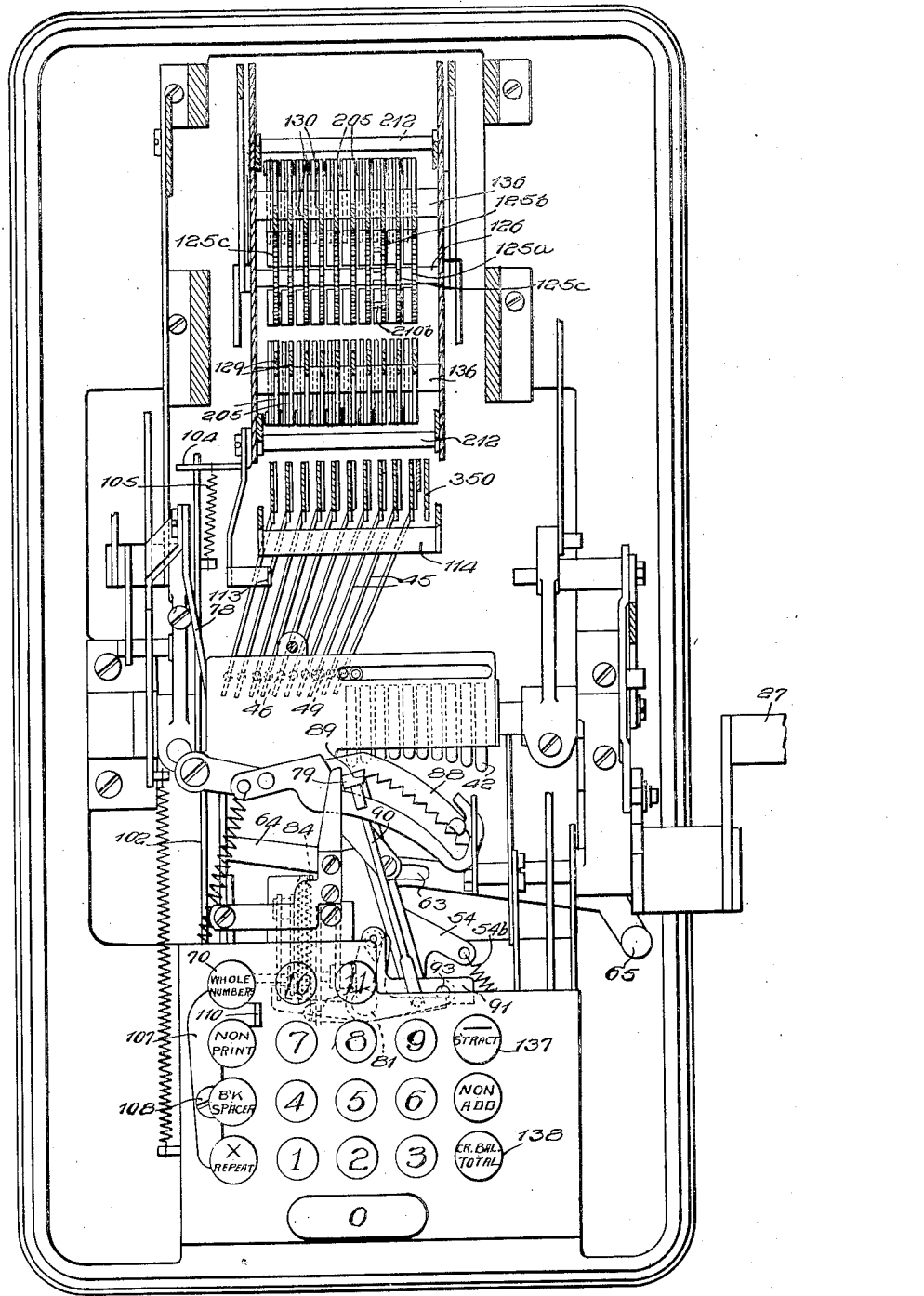

Nov. 1, 1932.  O. J. SUNDSTRAND  1,885,489
DECIMAL AND NONDECIMAL ADDING AND SUBTRACTING MACHINE
Filed June 13, 1928    6 Sheets-Sheet 3
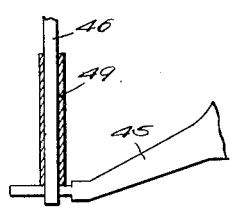
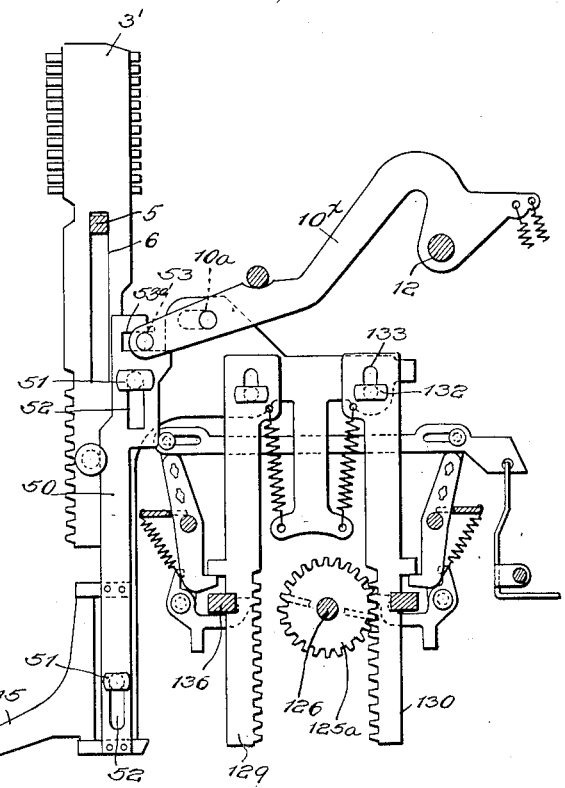
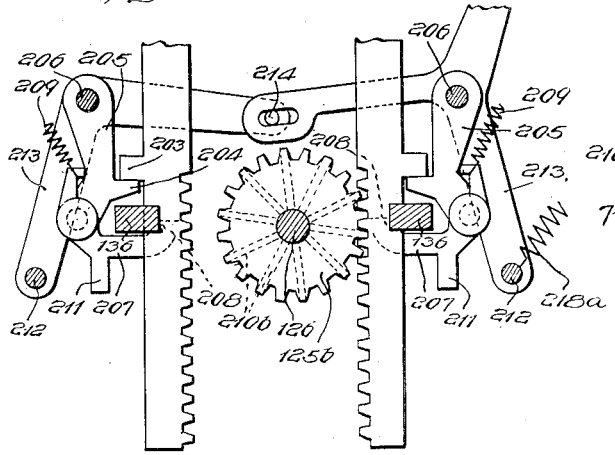
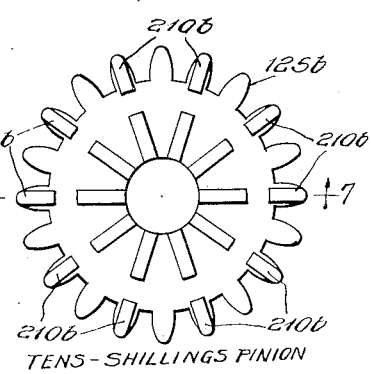
TENS-SHILLINGS PINION
Witness:
William P. Kilroy
Inventor:
Oscar J. Sundstrand
By Chindahl, Parker & Carlson
Attys.

Nov. 1, 1932.   O. J. SUNDSTRAND   1,885,489
DECIMAL AND NONDECIMAL ADDING AND SUBTRACTING MACHINE
Filed June 13, 1928   6 Sheets-Sheet 4
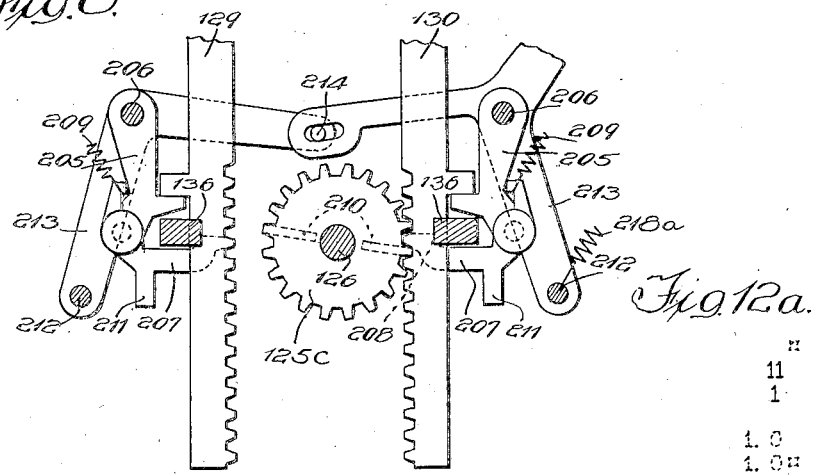
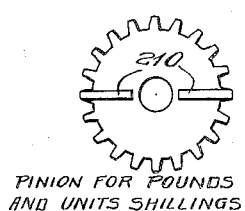
PINION FOR POUNDS
AND UNITS SHILLINGS
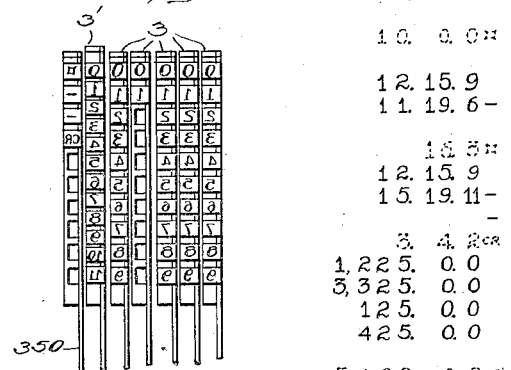
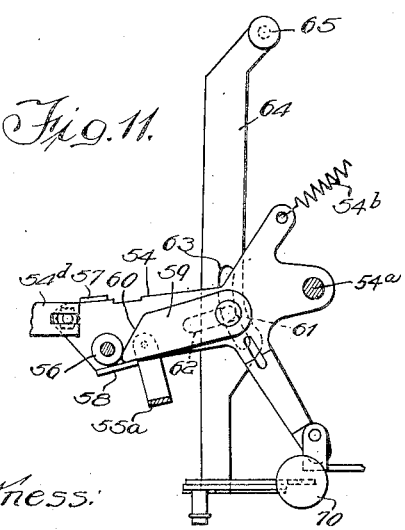
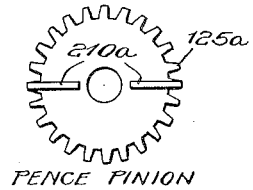
PENCE PINION
Witness:
William P. Kilroy
Inventor:
Oscar J. Sundstrand
By Arundell Parker Carlson
Attys Nov. 1, 1932.  O. J. SUNDSTRAND  1,885,489
DECIMAL AND NONDECIMAL ADDING AND SUBTRACTING MACHINE
Filed June 13, 1928  6 Sheets-Sheet 5
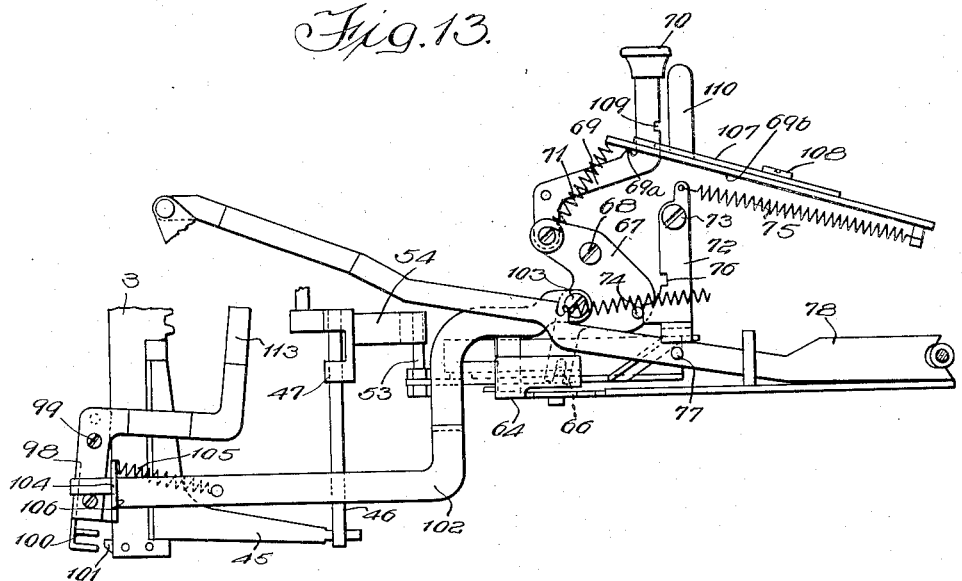
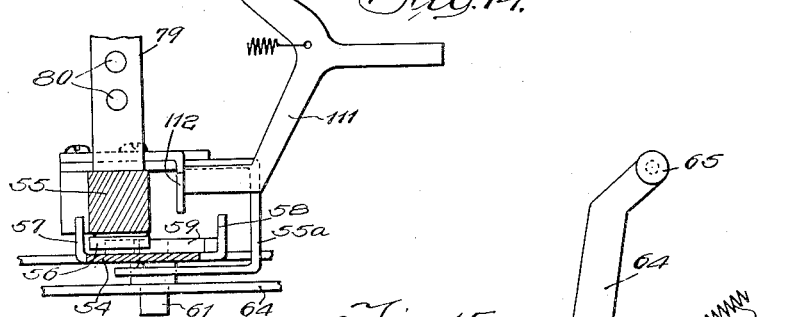
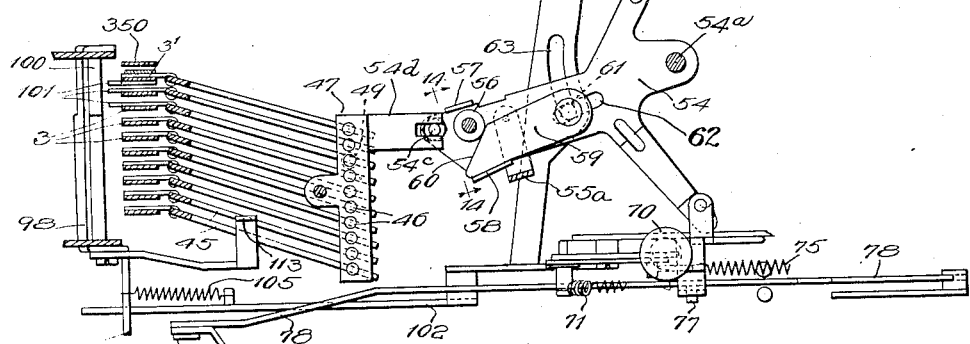
Witness:
William P. Kilroy
Inventor:
Oscar J. Sundstrand
By Chindahl Parker Carlson
Attys Nov. 1, 1932.    O. J. SUNDSTRAND    1,885,489
DECIMAL AND NONDECIMAL ADDING AND SUBTRACTING MACHINE
Filed June 13, 1928    6 Sheets-Sheet 6
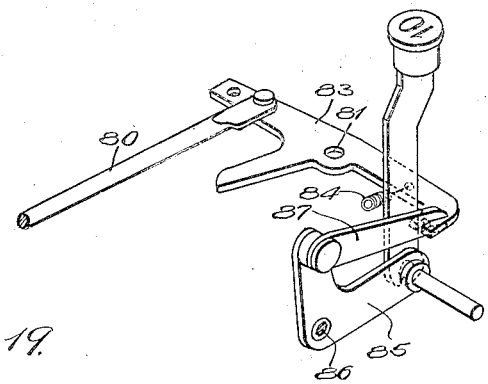
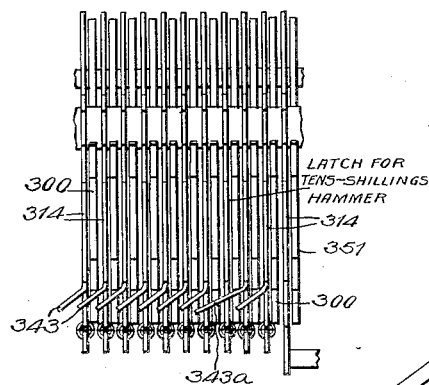
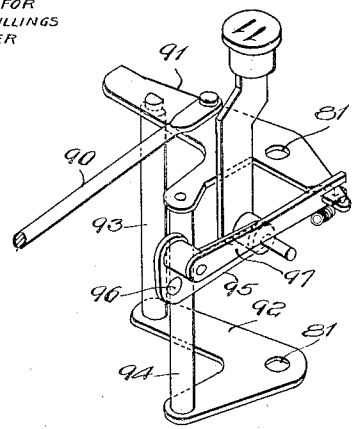
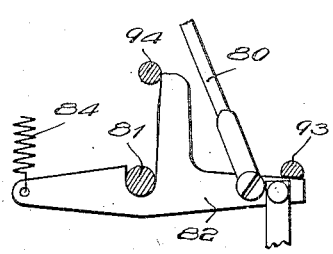
Inventor:
Oscar J. Sundstrand Patented Nov. 1, 1932

1,885,489

UNITED STATES PATENT OFFICE

OSCAR J. SUNDSTRAND, OF ROCKFORD, ILLINOIS, ASSIGNOR TO SUNDSTRAND CORPORATION, OF WILMINGTON, DELAWARE, A CORPORATION OF DELAWARE

DECIMAL AND NONDECIMAL ADDING AND SUBTRACTING MACHINE

Application filed June 13, 1928. Serial No. 284,978.

The object of this invention, generally stated, is to adapt a machine of the type shown in my application Serial No. 670,665 (and British Patent No. 223,866) to addition and subtraction in non-decimal, e. g., English currency notation as well as in decimal notation.

In the accompanying drawings,

Figure 1 is a longitudinal vertical sectional view of a machine embodying the features of my invention.

Fig. 2 is a horizontal sectional view of the machine.

Fig. 3 is a view of the pence type bar and related parts.

Fig. 4 is a view of the tens-shillings pinion and the racks and transfer mechanisms associated therewith.

Fig. 5 is a fragmental detail view of a stop associated with the tens-shillings type bar.

Fig. 6 is a detail view of the tens-shillings pinion.

Fig. 7 is a section on line 7—7 of Fig. 6.

Fig. 8 is a view of one of the pinions used for accumulating units-shillings and pounds, together with the racks and transfer mechanisms associated with such a pinion.

Fig. 9 is a detail view of one of the last mentioned pinions.

Fig. 10 is a fragmental view of some of the type bars.

Fig. 11 is a plan view of a portion of the stop-setting mechanism adjusted for dealing with whole numbers.

Fig. 12 is a detail view of the pence pinion.

Fig. 12ª represents a specimen of work done on the machine.

Fig. 13 is a view of the whole numbers key and associated parts.

Fig. 14 is a section in the plane of line 14—14 of Fig. 15.

Fig. 15 is a horizontal sectional view of a part of the stop-setting mechanism and certain related parts, adjusted for work in English money notation.

Fig. 16 is a perspective view of the "10" key and connections.

Fig. 17 is a perspective view of the "11" key and connections.

Fig. 18 is a fragmental view of a portion of the stop-setting mechanism.

Fig. 19 is a plan view of a portion of the hammer mechanism.

I have herein shown the invention embodied in a machine of the ten-key type such as is disclosed in the Sundstrand Patent No. 1,198,-487, but it will be understood that various features of the invention are not limited to use in machines of that character.

The sheet or tape on which the items, totals and remainders are to be printed may be supported in any ordinary or preferred manner. In the present instance, a cylindrical platen 2 is employed. The printing is effected by means of type bars which are herein shown as vertically reciprocatory. The machine illustrated in the drawings is adapted to register and print up to £9,999,999, 19s., 11d. A single type bar is employed to print the number of pence and one type bar for each numerical order of shillings and pounds, hence ten type bars are herein provided. The type bars that print the number of pounds and shillings are marked 3, the type bar that prints the number of pence being designated 3'. Said bars are arranged compactly side by side. As shown in Figs. 3 and 10, the type bar 3' is provided with twelve type adapted to print from "0" to "11", respectively. The type bars 3 for printing units of shillings and the number of pounds are each provided with ten type adapted to print from "0" to "9", respectively. The type bar for printing tens of shillings has two type adapted to print "0" and "1", respectively.

The means for guiding the type bars for vertical movement includes a fixed bar 5 (Fig. 1) extending through slots 6 in the type bars. The lower end wall of the slot serves to position the pence type bar for printing "11" and the units-shillings and pounds type bars for printing "9".

The means for vertically moving each type bar 3 into and out of printing position may be of any preferred construction, but is herein shown as comprising an arm 10 carrying a headed stud 10ª that lies in an elongated opening 11 in a rearwardly extending portion of the type bar. The arm 10 is rotatably mounted on a shaft 12 which is stationarily supported in the framework of the machine. Rigid with the arm 10 is an arm 13 which is yieldingly connected through two contractile springs 14 to a rod 15. The latter is carried by two side members 16, one on each side of the machine, which are guided for approximately vertical movement by a transverse rod 17 fixed in the machine frame, said rod extending through elongated openings 18 in the side members 16. Means of any preferred character may be employed to transmit movement from the operating handle 27 to the main rock shaft 26 and thence to the side members 16 for lifting the type bars, as, for example, the means fully disclosed in my application Serial No. 670,665, filed October 25, 1923, and in British Patent No. 223,866.

It will, of course, be understood that an electric motor may be used to rock the shaft 26 if desired.

When the operator pulls the handle 27 forward the side members 16 and the rod 15 move downwardly, the movement of said rod being yieldingly transmitted through the springs 14 and the arms 13 and 10 to such of the type bars as are at liberty to rise. All of the type bars rise at least to the cipher-printing position as they are normally slightly below that position. When the operator releases the handle upon completion of the forward stroke, means of the usual nature returns the handle to its normal position (shown in dotted lines in Fig. 1). The means for positively moving down those type bars which were raised in the forward stroke of the handle comprises a transverse rod 29 overlying the forward portions of the arms 10, said rod being operated by suitable means, such as that disclosed in my application Serial No. 670,665.

The means herein shown for limiting the extent to which the type bars may rise and thus to determine which numerals shall be brought to printing position includes a stationary group of stops 42 which may be similar to those fully disclosed in the Sundstrand Patents Nos. 1,198,487 and 1,583,102. It will here be sufficient to say that each stop is horizontally slidable in a forward and back direction, there being as many vertical rows of stops as there are type bars, each row containing eleven stops. When moved rearwardly from the position shown in Fig. 1, the stops are in the path of movement of devices carried by the type bars and thereby limit the upward movement of said type bars. These devices consist of arms 45 pivoted to the lower portions of the type bars, and pins 46 having openings through which the arms 45 extend. The pins 46 are guided for vertical movement in a slide 47 which is mounted on a stationary guide rod 48 extending transversely of the machine. The guide rod 48 is so positioned with reference to the group of stops 42 that the slide 47 is movable to carry the pins 46 from their normal or initial position at the left-hand side of the group of stops 42 into vertical alinement with the columns of stops (see Fig. 2).

There are eleven stops in each column, because there may be occasion to move the pence-type-bar pin 46 into register with any column. The lowermost stop in each column serves to position any type bar for printing "C". The tens of shillings type bar need never rise higher than the position for printing "1", and to insure that it shall never rise any higher I place on the pin 46 for said type bar a sleeve 49 (Fig. 5) the upper end of which stops against the bottom of the slide 47 when the type bar is in position to print "1".

The pence type bar 3' must have two more printing positions than the units-shillings type bar and the pounds type bars. If such additional printing positions were obtained by lifting the pence type bar two type spaces higher than the other type bars, an extensive reorganization of the rear portion of the machine would be required, but I have discovered that such reorganization can be avoided by providing a differential movement between the type bar 3' and its pin 46. As shown in Fig. 3, the arm $10^x$ that raises and lowers the pence type bar is connected to said type bar by means of a headed stud $10^a$ as in the case of the type bars 3. The arm 45 and the pin 46 for the pence type bar are not connected directly to said type bar, but are carried by a slide 50 which is mounted upon the pence type bar for vertical movement relatively thereto by means of headed studs 51 on said type bar extending through vertical slots 52 in the slide. The slide is caused to move up and down by means of a stud 53 on the extended forward end of the arm $10^x$, said stud lying within a notch $53^a$ in the upper end of the slide. Inasmuch as the studs $10^a$ and 53 are at different distances from the center 12, it will be seen that they will move different distances when the arm $10^x$ is swung. Thus, the pence type bar does not rise as far as its pin 46, consequently the printing positions of the pence type bar are closer together than those of the other type bars. As shown in Fig. 10, the twelve type on the pence type bar 3' are smaller and spaced closer together so as to occupy the same vertical space as the ten type on the units-shillings type bar and the pounds type bars.

The means for projecting the stops 42 into the path of the pins 46 comprises a bracket 54 (Figs. 1 and 15) which is pivoted in the machine frame at $54^a$, and is caused to swing toward the right by means of a contractile spring $54^b$. The rear end of the bracket 54 is connected to the slide 47 by means of a stud $54^c$ engaging a fork $54^d$ on said slide.

Overlying the bracket 54 is an arm 55 (Figs. 1 and 14) which also is pivoted at 54ª. The arm 55 carries a bracket 55ª that slidably supports the rear end of the bracket 54. The bracket 54 and the arm 55 swing as a unit, but when work in decimals is being done they occupy different relative positions than when work in English currency notation is being performed. On the lower side of the arm 55 is a roller stud 56 that may be adjacent to either of two lugs 57 and 58 on the bracket 54. A slide 59 on the bracket 54 is movable along the lug 58 and has a cam surface 60 arranged to act on the roller stud 56. A pin 61 on the slide 59 extends through a slot 62 formed longitudinally of the bracket 54 and through a curved slot 63 in a lever 64 pivoted at one end at 65 in the machine frame. The other end of the lever 64 has a pin-and-slot connection 66 (Fig. 13) with one arm of a bell crank lever 67 pivoted at 68. To the other arm of the bell crank lever 67 is pivoted the stem 69 of a key 70. A contractile spring 71 normally holds the key 70 elevated, with a stop lug 69ª in contact with the keyboard plate 69ᵇ, and also holds the lever 64 in the position shown in Fig. 15. When the lever 64 is in the position just referred to, the slot 63 is concentric with the axis 54ª, and hence does not affect the slide 59 as the racket 54 and the arm 55 swing on said axis. When the key 70 is depressed the lever 64 is swung forwardly (see Fig. 11), carrying with it the slide 59. To insure that the lever 64 shall stay in such position a detent 72 (Fig. 13) is pivoted at 73 and urged against a pin 74 on the bell crank lever 67 by a contractile spring 75. Said detent has a notch 76 to receive the pin 74. In the return stroke of the handle 27 the detent 72 is disengaged from the bell crank 67 through contact of a pin 77 (Fig. 13) with the lower end of the detent, said pin being set in the bar 78 that restores the bracket 54 and the slide 47 to initial position (see the Sundstrand Patent No. 1,198,487). In the return or leftward movement of the bracket 54, the lug 57 (Fig. 14) engages the arm 55 and carries the latter back to initial position, as in Fig. 15.

It may be stated that in both positions of the arm 64 the slot 63 is substantially concentric with the pivot 54ª.

On the rear end of the arm 55 is a post 79 (Figs. 1, 2 and 14) in which are slidably supported eleven push pins 80 for pushing the stops 42 into their rear or operative positions. The forward end of each push pin 80 is pivoted to a three-arm lever pivoted on the axis 81. Each of said levers is connected through suitable linkage to one of the numeral keys numbered from "0" to "10", inclusive. The three-arm levers which are operated by the numeral keys numbered from "0" to "9" inclusive, are numbered 82 in the drawings (see Fig. 18). The lever which is operated by the "10" key is numbered 83 (see Fig. 16). Contractile springs 84 acting upon said three-arm levers serve to retract the push pins 80 and return the numeral keys to normal position after depression.

The linkage between the numeral keys numbered from "0" to "9" inclusive, and the levers 82 may be of any preferred character, as, for example, that fully disclosed in my Patent No. 1,626,889. The linkage between the "10" key and the lever 83 also may partake of various forms, the present construction being shown in Fig. 16, wherein it will be seen that the stem of the "10" key is pivoted to the forwardly extending arm of a bell crank lever 85 pivoted at 86, the upper arm of said bell crank lever being connected to one arm of the lever 83 by means of a link 87.

The spring 54ᵇ moves the rear ends of the push pins 80 into register with successive columns of stops 42, the action of the spring being controlled by an escapement comprising a curved ratchet bar 88 (Fig. 2), a tooth 89 on the upper end of the post 79, and a push pin 90 the rear end of which is arranged to engage the ratchet bar 88 and push it out of engagement with the tooth 89. The forward end of the push pin 90 is pivoted to a rigid frame (see Fig. 17) comprising an upper lever 91, a lower lever 92 and two vertical rods 93 and 94. Said frame is pivoted on the axis 81. The rod 94 normally stands in contact with one arm of each of the levers 82 and 83 and thus a rearward movement is imparted to the escapement push-pin 90 whenever any one of the numeral keys numbered from "0" to "10," inclusive, is depressed.

Inasmuch as upward movement of the pence type bar into position to print "11" is limited by contact of the lower end wall of the slot 6 with the bar 5, instead of by a stop 42, the "11" key is merely arranged to operate the escapement for the bracket 54. As shown in Fig. 17, the stem of the "11" key is connected to one arm of a bell crank lever 95 pivoted at 96, the other arm of said bell crank being connected by means of a link 97 to one arm of the lever 91.

Reverting now to the means for adjusting the machine to add or subtract in decimal notation: Depression of the whole numbers key 70 withdraws the cam surface 60 from between the roller stud 56 on the arm 55 and the lug 58 on the bracket 54, thereby allowing the spring 54ᵇ to swing the bracket 54 toward the right until the lug 58 stops against the roller stud 56. Such movement of the bracket 54 caused movement of the slide 47 toward the right, whereby the pins 46 for the pence, units-shillings and tens-shillings type bars were carried to the right of any stops 42 that might be subsequently set by means of the numeral keys. Any such stops will therefore act to position only the pounds type bars and racks.

In setting up an item consisting of a whole number of pounds, with the key 70 depressed, the "0" key is not operated for the shillings and pence columns, the ciphers for those columns being automatically printed.

In order to prevent the pence, units-shillings and tens-shillings type bars from rising above the cipher-printing position when whole numbers are being registered or printed, I provide a detent bail 98 (Figs. 1, 13, and 15) which is pivoted on the axis 99 and which has a flange 100 adapted to overlie projections 101 on the lower ends of the pence, units-shillings and tens-shillings type bars. The bail 98 is yieldingly connected to the bell crank lever 67 by means of a link 102, the forward end of which is pivoted to the bell crank 67 at 103 and the rear portion of which extends slidably through an opening in a lug 104 on the bail 98. A contactile spring 105 (Fig. 13) attached to the lug 104 and the link 102 yieldingly holds said lug against a shoulder 106 on said link. When the whole numbers key 70 is depressed, the link 102 is drawn forward so as to place the flange 100 in the path of the lugs 101, thereby preventing the pence, units-shillings and tens-shillings type bars from rising farther than for printing ciphers.

As hereinbefore explained the bar 78 normally releases the whole numbers key 70 and effects restoration of the bracket 54 and arm 55 to the English Currency notation position at the end of every cycle of operations of the machine. If desired, means may be provided to lock the Whole Numbers key down. The means herein shown for this purpose comprises a detent 107 pivoted at 108 and adapted to engage in a notch 109 (Fig. 13) in the stem of the whole numbers key 70. 110 is a handle portion on the detent 107.

Means such, for example, as that disclosed in Patent No. 1,583,102, may be provided to enforce a spacing stroke prior to the printing of a total. The arm 312 described in said patent and herein numbered 111 (Fig. 14) is operated by a projection 112 on the arm 55.

In case the operator has accumulated some shillings or pence, and has subsequently accumulated whole numbers of pounds, the pence and shillings type bars must be free to rise as far as necessary to print the correct total, even though the whole numbers key 70 be locked down or held depressed by the operator. I therefore provide the bail 98 with a forwardly and upwardly projecting arm 113 (Figs. 1, 13 and 15). When the bail 98 is in its forward or effective position, the arm 113 lies in front of and close to the swinging frame 114. For a description of the construction and operation of this frame, reference may be made to U. S. Patent No. 1,583,102 and British Patent No. 223,866, wherein said frame is numbered 48°. Upon completion of a spacing stroke the frame 114 is swung forward by spring means 115, whereby the bail is forced back out of the path of the projections 101, the spring 105 yielding to allow such withdrawal of the bail. Consequently, when the total is taken, the pence and shillings type bars are free to rise to the height required to print the correct total.

The computing mechanism comprises a series of pinions rotatably mounted upon a transverse shaft 126 which is supported for sliding movement longitudinally of the machine by means fully disclosed in my U. S. application Serial No. 670,665 and in British Patent No. 223,866. The pence pinion is numbered 125$^a$ (Figs. 3 and 12), the tens-shillings pinion 125$^b$ (Figs. 4 and 6), and the units-shillings and pounds pinions 125$^c$. The pinions are located between two sets of opposed racks 129 and 130. One rack of each set is connected to each of the type bars 3, 3'. Addition is accomplished by means of the rear racks 130. When an item is to be added, the pinions are moved forward into neutral position between the two sets of racks before the type bars are raised, and the pinions are moved rearwardly into mesh with the rear racks just before the type bars are moved downwardly. Addition therefore occurs in the down stroke of the rear racks.

Subtraction is effected by means of the front racks 129, the pinions being moved into mesh with said racks just before the latter descend. Subtraction thus takes place in the down stroke of the front racks.

Referring now to the manner in which the racks are connected to the type bars: The upper end of each rack is attached to a rearwardly extending portion 131 of one of the type bars 3 by means of a headed pin or stud 132 extending through a vertically elongated opening 133 in the rack. A contractile spring 134 attached at its upper end to the rack and at its lower end to a downwardly extending portion 135 of the type bar tends to move the rack downwardly with relation to the type bar one tooth space for transfer purposes. The racks are guided in grooved bars 136.

The means for moving the pinions into and out of mesh with the racks, as required in the addition and subtraction of items and the taking of subtotals and final totals, may be of any preferred character, as, for example, that fully disclosed in my application Serial No. 670,665 and British Patent No. 223,866. The keyboard includes a subtraction key 137 (Fig. 2) and a credit balance or total key 138.

Referring now to the transfer mechanism: There is a set of transfer devices for the rear racks 130 to carry amounts from one pinion to the next higher pinion in operations involving addition, and a set of transfer devices for the front racks 129 to carry amounts from one pinion to the next higher pinion in operations involving subtraction. The transfer devices associated with the units-shillings pinion and the pounds pinions may be (and in this instance are) identical in construction with those fully disclosed in my application Serial No. 670,665. All of the type bars 3, 3' are moved to their normal lower position by the rod 29, the extent of downward movement of the racks being limited (except in a transfer operation) by contact of lugs 203 (Fig. 4) on the racks with stop lugs 204. When an amount is to be transferred from one pinion to the next, the stop lug 204 for the rack meshing with such next higher pinion is withdrawn, thereby allowing that rack to descend under the action of its spring 134 until its lug 203 stops against the adjacent bar 136. The extent of such further descent of the rack is just sufficient to turn the pinion for that rack through the distance of one tooth. The stop lugs 204 for all the racks except the pence racks are formed on pawls 205 which are suspended from a pivot 206 in the machine frame. To the lower end of each pawl 205 is pivoted a dog 207 having a shoulder 208 adapted to engage the edge of the adjacent bar 136. A contractile spring 209 normally holds the shoulder 208 in engagement with the bar 136, the stop lug 204 being then in position to support the corresponding rack.

In the case of the units-shillings pinion and the pounds pinions the means for disengaging the tooth 208 from the bar 136 consists of two diametrically opposite transfer lugs 210 (Fig. 9) fixed to each of said pinions. Two lugs 210 are provided because each of said pinions has twenty teeth. When the amount registered by one of said pinions reaches "9", continued rotation of the pinion as the rack descends brings one of the lugs 210 against the end of the dog 207 associated with the next higher rack, thereby depressing the dog until the shoulder 208 is clear of the bar 136, whereupon the spring 209 (assisted by the downward pressure of the rack) pulls the dog and the pawl 205 away from the last mentioned rack until a lug 211 on the dog stops against a restoring rod 212. The lug 204 is then out of the path of said rack of next higher order and the latter therefore moves down one tooth space under the influence of its spring 134, the rack being stopped by the bar 136.

The pence pinion (Fig. 12) has twenty-four teeth and is provided with two diametrically opposite transfer lugs 210ª for disengaging the adjacent dogs 207 from the bars 136.

The tens of shrillings pinion (Fig. 6) has twenty teeth and is provided with ten equidistant transfer lugs 210ᵇ for disengaging the adjacent dogs 207 from the bars 136.

After each transfer operation the pawl 205 and the dog 207 are restored to their normal position by the rod 212, there being one such restoring rod for each set of transfer mechanisms. Each rod 212 is carried by two bell crank levers 213 (Fig. 4) which are pivoted in the machine frame at 206. The bell crank levers at each side of the machine are connected for simultaneous swinging movement by a pin-and-slot connection, as shown at 214 in Fig. 4. The restoring rods 212 are simultaneously moved toward and away from each other by means of two arms 215 (Fig. 1), each formed integral with one of the bell crank levers 213, said arms 215 extending into the space between the side members 16. A rod 216 the ends of which lie in elongated openings 217 in the side members 16, is normally held against the lower end walls of said opening by means of springs (not shown). When the side members 216 move downwardly in the forward stroke of the handle 27 and hence as the type bars are moving upwardly, the rod 216 is carried into engagement with the arms 215, thereby causing the rods 212 to move toward each other to restore any transfer pawls and dogs that may have been concerned in a previous transfer operation. When the side members 16 rise, a contractile spring 218ª (Fig. 1) returns the rods 212 to the normal position shown in said view.

When the type bars are raised for a printing operation the racks do not begin to rise until the studs 132 (Fig. 1) engage the upper ends of the elongated openings 133. Those racks, however, which have descended below the normal position in order to effect a transfer rise practically simultaneously with the type bars and thus are lifted before the stop lugs 204 are restored to normal position by the rod 212.

It may be here stated that when any pinion stands at zero, one of the transfer lugs on said pinion lies directly beneath one of the dogs 207 associated with the adding racks 130 if the amount accumulated be a debit or positive amount, or directly beneath one of the dogs 207 associated with the group of subtracting racks 129 if the amount accumulated be a credit or negative amount. Therefore, when a total is to be printed, those racks which mesh with the pinions standing at zero cannot rise, the remaining racks rising until the rotation of their pinions brings the transfer lugs thereon into contact with the respective dogs 207. The type bars 3, 3' are then in position to print the total accumulated on the pinions.

If desired, means such as that fully disclosed in my application Serial No. 118,628, filed June 26, 1926, may be employed for the purpose of automatically introducing the "fugitive unit" into the pence wheel whenever the totalizer passes through zero, thus providing for the automatic printing of the correct total when the latter is a negative or credit amount.

The hammer mechanism may be of any preferred character. Herein is shown a hammer mechanism similar to that disclosed in my application Serial No. 670,665 (see divisional Patent No. 1,747,743). 300 are the hammers. The hammer-controlling latches 314 (Fig. 19) are provided with lugs 343 arranged to overlie the latch next to the left, in order to effect printing of ciphers to the right of any significant digit, except in the case of the latch associated with the hammer for the tens-shillings type bar. Since it is undesirable to print ciphers in the tens-shillings column, the lug 343 is omitted from the last-mentioned latch, the lug 343ª on the latch associated with the hammer for the units-shillings type bar being made long enough to overlie the latch for the units-pounds hammer.

If desired, means may be provided for printing a distinguishing character in connection with certain imprints, as, for example, in connection with a final debit total, or a credit total, or an item which is subtracted, or an item which is printed but not added or subtracted. For a disclosure of such sign-printing means reference may be made to my application Serial No. 670,665. The only portion of such a means herein shown consists of the type bar 350 (Figs. 2 and 10) and the hammer 351 (Fig. 19).

The capabilities of the machine are indicated in the specimen of work reproduced in Fig. 12ª. The fact that certain imprints are in red has been denoted by the use of dotted lines.

The uppermost imprint in Fig. 12ª is clear sign. The item of eleven pence is added and printed by depressing the "11" key and pulling the handle 27. In the downward stroke of the racks 130 the pence pinion (Fig. 3) is turned eleven tooth-spaces.

The item of one pence is added and printed by depressing the "1" key and pulling the handle.

After a blank stroke of the handle, a second handle pull causes the printing of the sub-total of one shilling. Another operation of the handle with the total key held depressed effects the printing of the total and the clearing of the machine.

The item of nineteen shillings is added and printed by depressing the "1", "9", and "0" keys in succession, and operating the handle. After adding and printing the item of one shilling in a similar manner, a blank stroke and a second stroke with the total key depressed results in the printing of the final total of one pound.

The item of nine pounds is added and printed by depressing the "9" key once and the "0" key three times and pulling the handle. (No cipher is printed in the tens-shillings column, since the latch 314 for the corresponding hammer has no lug 343.) The item of one pound is added and printed in a similar manner, after which the total of ten pounds is printed and cleared by operation of the handle and the total key, as before described.

The item of 12 pounds, 15 shillings, 9 pence having been added and printed in the manner before described, the item of 11 pounds, 19 shillings, 6 pence is set up on the keyboard, the subtraction key depressed, and the handle pulled, whereby the last mentioned item is subtracted and printed. After a blank stroke the remainder of 16 shillings, 3 pence may be computed, printed and cleared.

The item of 12 pounds, 15 shillings, 9 pence having been added and printed, and the item of 15 pounds, 19 shillings, 11 pence having been subtracted and printed, the credit balance or overdraft of 3 pounds, 4 shillings, 2 pence is computed, printed and cleared by holding the subtraction key depressed during the spacing stroke, and holding the total key depressed during the next following stroke.

If the operator has a succession of items consisting of whole numbers of pounds, the whole numbers key 70 may be latched down, and the numbers set up, added and printed in succession. In the printing of such an item the pence and units shillings type bars rise just enough to print ciphers.

Although the invention has been disclosed as embodied in a machine of the type shown in British Patent No. 223,866, it should be understood that certain features are not restricted to use in such a machine, and that various detail changes may be made without departing from the spirit and scope of the invention as set forth in the appended claims.

In certain of the following claims, the term "actuators" has been applied to the bars 3, 3′, since they actuate the computing mechanism and the printing mechanism.

The direct subtraction mechanism is claimed broadly in my application Serial No. 670,665. The mechanism for introducing the fugitive unit is claimed broadly in my application Serial No. 118,628.

I claim as my invention:

1. In a ten-key computing machine, a stationary group of stops, a bracket and an arm pivoted on the same axis, a plurality of key-actuated levers, a push pin pivoted to each lever, the free ends of said push pins being supported by said arm, means for swinging said bracket and arm to carry the free ends of the push pins into and out of operative relation to the various stops, a plurality of decimal actuators, a non-decimal actuator, an arm pivoted to each decimal actuator, an arm pivoted to the non-decimal actuator for differential movement with respect to the non-decimal actuator, a pin on each of the arms which are pivoted to the actuators, a slide engaging the last-mentioned pins, said slide being movable transversely of the stops, a connection between the slide and the swinging bracket for effecting synchronous movement of said slide and bracket, and an adjustable connection between the first mentioned arm and the bracket to vary the relation between the push pins and the other pins.

2. In a computing machine, a non-decimal type bar, a slide mounted on the type bar for movement longitudinally of the latter, a group of stops, said slide being arranged to coact with said stops, and means for moving the type bar comprising a pivoted arm connected to the type bar and the slide at different distances from the axis of the arm.

3. A computing machine comprising a series of decimal type bars, a non-decimal type bar, members connected to the decimal type bars, a member connected to the non-decimal type bar for differential movement with respect to the non-decimal type bar, a plurality of rows of stops similarly spaced in all rows for engagement by any of said members each row containing the same number of stops, and the number of stops being related to the largest number that can be printed by any one type bar, and keys connected to set a stop in each row, the number of keys being equal to the largest number that can be printed by any one type bar.

4. In a stop-setting mechanism, a bracket and an arm pivoted on the same axis, a cam slide mounted on the bracket and engaging the arm, a lever having a slot substantially concentric with said axis, said cam slide having a pin entering said slot, a key and connections for swinging said lever to move the cam slide, and means to swing the bracket.

5. In a stop-setting mechanism, a bracket and an arm pivoted on the same axis, a cam slide mounted on the bracket and engaging the arm, lugs on said bracket between which the cam slide and the arm lie, a spring for moving the bracket in one direction, means for moving the bracket in the opposite direction, means acting on the arm to restrain the spring, and manipulative means to move the cam slide longitudinally of the bracket to adjust the relation between the bracket and the arm.

6. In a computing and/or printing machine, the combination of a series of members, some of which are used in dealing with whole numbers and another of which is used in dealing with another class of numbers, means including a whole numbers key for controlling movement of the last mentioned member, said key, when in operated position, serving to prevent movement of said last mentioned member, means to hold the key in operated position, a part which assumes a certain position when a total is to be taken, and means controlled by said part for releasing said last mentioned member in case the whole numbers key is then in operated position.

In testimony whereof, I have hereunto affixed my signature.

OSCAR J. SUNDSTRAND.